United States Patent [19]

Taylor

[11] 4,205,893
[45] Jun. 3, 1980

[54] KALEIDOSCOPE

[75] Inventor: Beverly W. Taylor, Hermann, Mo.

[73] Assignee: Steven Manufacturing Company, Hermann, Mo.

[21] Appl. No.: 931,302

[22] Filed: Aug. 7, 1978

[51] Int. Cl.² ............................................. G02B 27/08
[52] U.S. Cl. .......................................... 350/4.2; 353/2
[58] Field of Search ...................... 350/4.1, 4.2; 353/1, 353/2

[56] References Cited

U.S. PATENT DOCUMENTS

| 2,452,363 | 10/1948 | Flotron | 350/4.1 |
| 3,100,418 | 8/1963 | Posner | 350/4.2 |
| 3,383,150 | 5/1968 | Powers | 350/4.2 |
| 3,738,036 | 6/1973 | Landsinger et al. | 350/4.2 X |
| 3,756,685 | 9/1973 | Forsee | 350/4.2 |
| 3,930,711 | 1/1976 | Powell | 350/4.1 |

Primary Examiner—Richard A. Wintercorn
Attorney, Agent, or Firm—Polster, Polster and Lucchesi

[57] ABSTRACT

A kaleidoscope is provided having an object enclosure containing a multiplicity of pattern producing objects mounted to one end of a tubular body member. The mounting method employed permits object enclosure rotation in two directions about the body member. Preferably, the object enclosure includes a first wall arranged in a spherical shape encompassing a chamber. A second wall is concentrically arranged with respect to the spherical shape interiorly of the chamber. The first and second walls delimit at least one compartment for the pattern producing objects. The chamber volume inboard of the second wall is visually unobstructed to permit observation along a line of sight therethrough. Consequently, two compartment segments on opposite sides of the object enclosure may be viewed simultaneously. The first wall of the object enclosure has a material thickness having first and second outboard surfaces on opposite sides thereof. One of the first and second outboard surfaces has a plurality of facets formed in it. The image provided at one end of the body member is viewed from the opposite end of the body member through a three-sided mirror. The dual rotation capability, faceted wall and spherical construction produce an unusual kaleidoscope image for observation.

14 Claims, 6 Drawing Figures

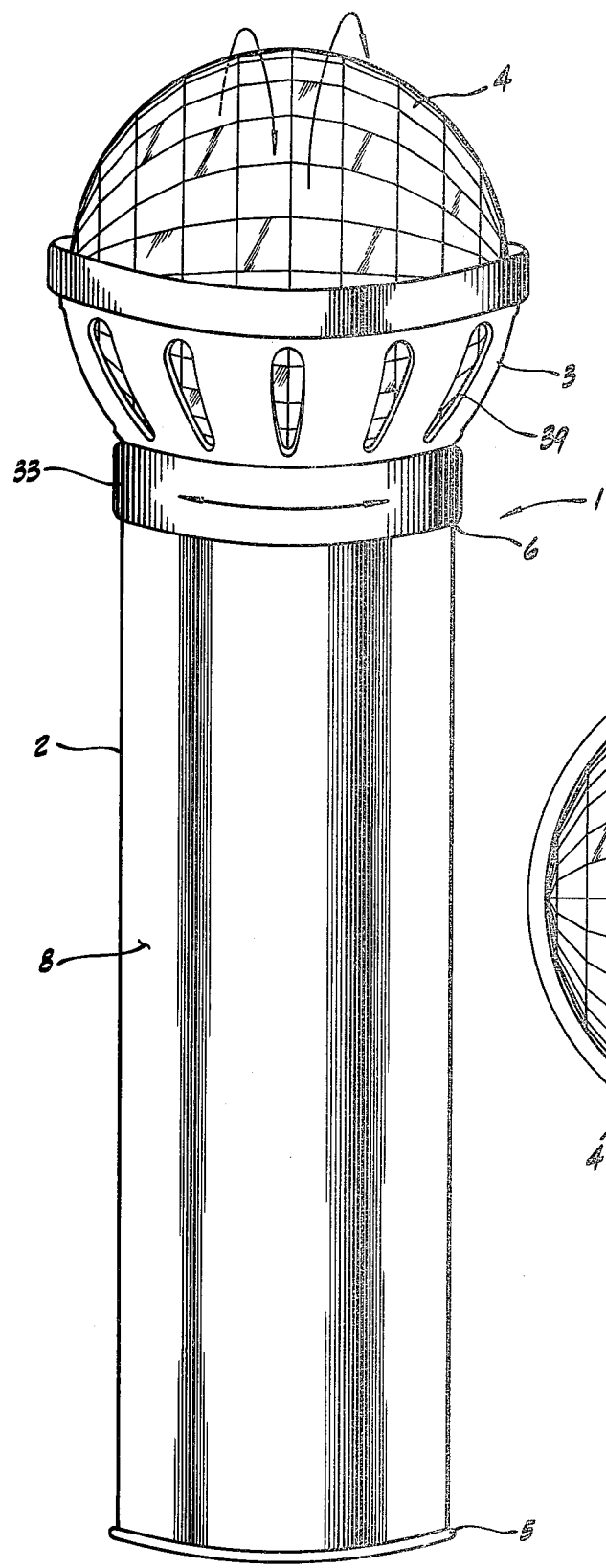
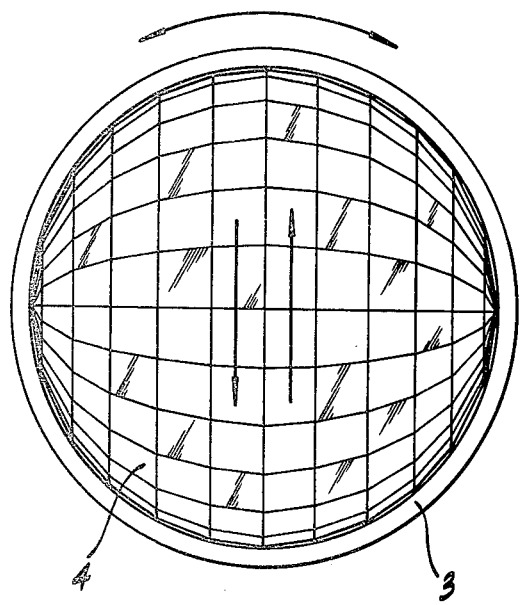
FIG. 1.
FIG. 2.

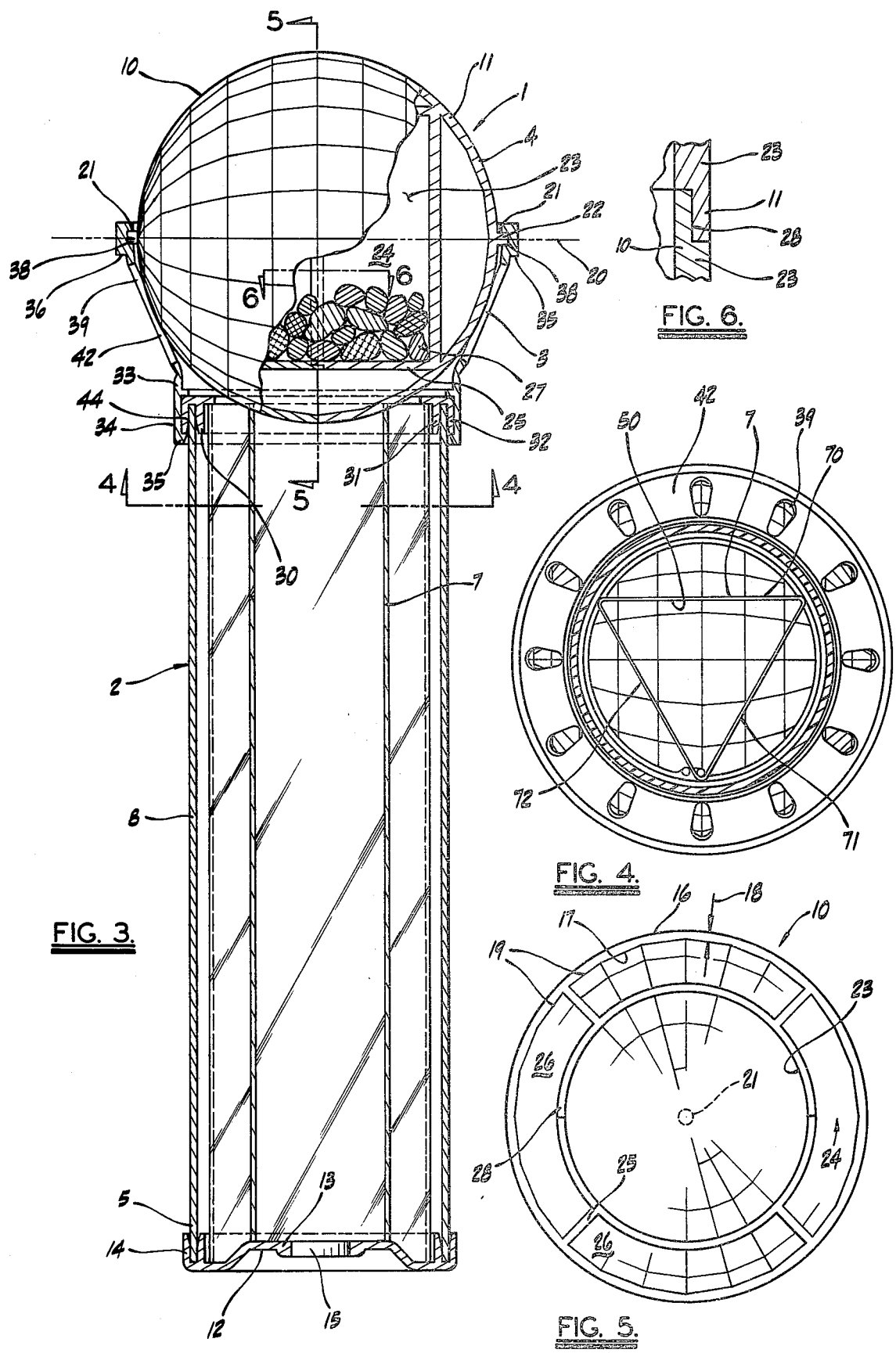

KALEIDOSCOPE

BACKGROUND OF THE INVENTION

This invention relates to kaleidoscopes, and in particular to a novel method and structure for presenting a plurality of pattern producing objects at the image forming end of a kaleidoscope.

Kaleidoscopes of various forms and embodiments are well known in the art. In general, these prior art devices include a tubular body part having an eye piece at a first end and a rotatable head at a second end. The body part has a V-shaped, two sided reflector mounted in it which runs between the eye piece and the second end. The V-shaped reflector itself generally defines a second opening along the second end of the body part, as the field of vision observed through the eye piece is restricted to a line of sight along the reflector. The head conventionally includes a section containing a large number of pattern producing objects. Conventionally, the pattern producing objects rotate with the head in a plane parallel to the plane of the second end of the tubular body part. As the section rotates, the pattern producing objects tumble in front of the second opening. The image viewed through the two sided reflector produces the well known kaleidoscope image at the eye piece.

A number of attempts have been made to vary the image observed through a kaleidoscope. One design finding commercial appeal is the U.S. Pat. No. 3,756,685, to Forsee, assigned to the assignee of the present invention. In Forsee, a transparent annulus is rotated in a plane perpendicular to the plane of the body section along the end where the pattern producing objects are exposed to the reflector. Because of the rotational pattern there presented, two distinct sets of objects come before the opening simultaneously, and an unusual three dimensional design is presented to an observer.

The invention disclosed hereinafter is similar to that disclosed in Forsee in that two distinct sets of objects are observable through the kaleidoscope. However, the mounting method employed, the object enclosure and the mirror employed all differ structurally from the Forsee device. In particular, the mounting method enables the object enclosure to be rotated in two planes about the body member. The object enclosure, which is constructed from translucent plastic, resembles prismatic glass in that one wall of the material thickness is faceted. The faceted construction itself enhances the observed image. Finally, the observed image is viewed along a three-sided reflector mounted in the body member. The overall result is an unusual three dimensional design heretofore unobtainable with kaleidoscopes of the prior art.

One of the objects of this invention is to provide a kaleidoscope having an object enclosure mounted for rotation in two planes about a body member of a kaleidoscope.

Another object of this invention is to provide a kaleidoscope having a three dimensional image.

Another object of this invention is to provide a low cost kaleidoscope design.

Still another object of this invention is to provide an improved structure for mounting pattern producing objects to a tubular structure.

Yet another object of this invention is to provide a kaleidoscope employing a spherical object enclosure.

Yet another object of this invention is to provide an object enclosure for a kaleidoscope having a faceted surface observable through the kaleidoscope.

Other objects of this invention will be apparent to those skilled in the art in light of the following disclosure and accompanying drawings.

SUMMARY OF THE INVENTION

In accordance with this invention, generally stated, a kaleidoscope having a body member is provided with a object enclosure rotatable in at least two planes about the body member.

In the preferred embodiment, the object enclosure is a transparent sphere which is compartmentalized, the compartments being arranged so that at least two sets of pattern producing objects from opposite sides of the sphere are presented to an observer simultaneously. The mounting employed for object enclosure attachment permits rotation of the sphere both perpendicularly to the plane of the body member and transversely thereto. The object enclosure also is formed with a faceted surface to enhance image presentation.

BRIEF DESCRIPTION OF THE DRAWINGS

In the drawings,

FIG. 1 is a view in side elevation of one illustrative embodiment of kaleidoscope of this invention;

FIG. 2 is a top plan view thereof;

FIG. 3 is a transverse, longitudinal sectional view, partly broken away, of the kaleidoscope shown in FIG. 1;

FIG. 4 is a sectional view, taken along the line 4—4 of FIG. 3;

FIG. 5 is a sectional view, taken along the line 5—5 of FIG. 3; and

FIG. 6 is a sectional view, partly broken away, taken along the line 6—6 of FIG. 3.

DESCRIPTION OF THE PREFERRED EMBODIMENT

Referring now to the drawings, reference numeral 1 indicates kaleidoscope of this invention. Kaleidoscope 1 includes a body member 2, mounting means 3 and an object enclosure 4.

Body member 2 is a hollow, cylindrical structure defined by a side wall 8, the member 2 initially being open ended along an end 5 and an end 6. As shown in FIG. 3, a reflecting device 7 is inserted in the body member 2 and extends substantially between the ends 5 and 6 thereof. In the embodiment illustrated, the reflecting device is triangular, having sides 70, 71 and 72 best seen in FIG. 4. The inboard facing surfaces of the sides 70, 71 and 72 include a reflective surface 50 which may be applied to or may be an integral part of the material used to construct the reflecting device 7. Conventionally, reflecting device 7 is manufactured from sheet metal and folded into the triangular shape shown. The inboard facing or reflective surface 50 is obtained by polishing the sheet metal. Body member 2 may be constructed from a variety of materials. Cardboard, for example, works well. Decorative designs, not shown, or other information, may be printed on the body member 2.

The end 5 of body member 2 has an eye piece 12 closing it. Eye piece 12 is conventional and includes a wall 13 having a flange 14 extending about its perimeter, as is best illustrated in FIG. 3. The wall 13 has an opening 15 through it. The opening 15 is positioned so that the line of sight of an observer is restricted. That is to say, observation through member 2 from the end 5 is restricted along the reflecting device 7. Flange 14 commonly is crimped or otherwise pressed or coined over to engage the side wall 8 of the body member 2, thereby mounting the eye piece to the body member.

Object enclosure 4 generally is spherical in shape. In the embodiment illustrated, the spherical shape is defined by a first part 10 and a second part 11. Each of the parts 10 and 11 forming the object enclosure 4 are symmetrical with one another and only a single part 10 is shown in FIG. 5. Each of the parts, however, has an outer surface 16 and an inner surface 17 separated by a thickness 18 of transparent material. Preferably, the outer surface 16 is smooth, while the inner surface 17 has a plurality of facets 19 formed in it. The facets 19 give the appearance of extending circumferentially about the enclosure between a pair of poles 21 spaced from one another along an axis 20. Each of the poles 21 has a projection 22 extending axially outwardly from it. The function of the projections 22 is described in greater detail hereinafter.

As best illustrated in FIG. 5, a cylindrical wall 23 is spaced inwardly of the surface 17 and defines a chamber 24 therebetween. The chamber 24 in turn is divided by a plurality of arcuate wall sections 25 into a predetermined number of chamber parts 26. A multiplicity of pattern producing objects 27 are distributed along the chamber parts 26. The objects 27 produce the kaleidoscope image in operation of the kaleidoscope 1, as later described.

The wall 23 of one of the parts 10 and 11 has an annular lip 28 formed in it, which mates with the corresponding wall 23 of the other of parts 10 and 11 to permit interconnection of the parts. Parts 10 and 11 may be attached to one another by any convenient method. Suitable epoxy or other type of adhesive work well, for example.

Mounting means 3 includes a support ring 30 attached to the end 6 of the body member 2. Support ring 30 is an annular device mounted over and attached to the end 6 by any convenient method. In general, it includes at least one projection 31 and a wall 32 spaced from one another so as to define a channel 44. The channel 44 is sized to receive the material thickness of the body member 2 in a conventional manner. A rotating structure 33 is attached to the support ring 30 along a cylindrical base section 34 of the structure 33. The base section 34 includes a plurality of inwardly projecting tabs 35 which mount the rotating structure 33 to the support ring 30 along the wall 32 thereof. The engagement of the tabs 35 with the support ring 30 is such as to permit rotation of the structure 33 on and about the support ring.

A generally semicircular receptacle 42 extends outwardly from the base section 34. The receptacle 42 has a pair of mounting arms 36 and 37 integrally formed with it. The arms 36 and 37 have suitable openings 38 and 39, respectively, formed in them, which are sized to receive the projections 22 of the parts 10 and 11. After insertion, the projections 22 are free to rotate, as later described in greater detail.

The receptacle 42 includes a side wall 43 which has a plurality of openings 39 formed in it. The openings 39 serve a dual purpose. First, they admit light along the end 6 of the body member 2, enhancing the image presented there. Second, they make the rotating structure 33 more appealing aesthetically. The particular openings 39 utilized in conjunction with the rotating structure 33 are tear dropped in the embodiment illustrated, although other opening designs may be employed, if desired.

In use, the chamber parts 26 of object enclosure 4 are filled with suitable objects 27. The parts 10 and 11 are then joined to one another. Thereafter, the projections 22 are inserted in the openings 38 and 39 of the arms 36. Either before or after that insertion, the rotating structure 33 is snapped into place over the support ring 30 and the remaining components of the kaleidoscope 1 are positioned within and to the body member 2. Those skilled in the art will recognize that the order of assembly of the various structural components of the kaleidoscope 1 may vary.

When assembled, the field of vision of an observer is restricted to a line of sight defined by the opening 15 in the eye piece 12, along the reflecting device 7 and through the end 6 of the body member 2. It may be observed, by reference to FIG. 3, that the end 6 of the body member 2 defines a plane 40. The mounting means 3 permits the objects 27 to be presented to the field of view of an observer both by rotational movement in the plane 40, that is, presented along the plane 40 by rotation of the structure 33 on the support ring 30, and simultaneously permits rotation of the object enclosure 4 in a plane perpendicular to the plane 40 by rotation of the projections 22 in the arms 36 and 37. In addition, the construction of the enclosure 4 permits simultaneously presentation of the objects 27 at different distances from the end 6 of the body member 2, regardless of whether rotation about the body member 2 is in the plane 40 or perpendicular thereto. Because the enclosure 4 is mounted remotely from the body member 2, it may be constructed and preferably is constructed from a transparent material. Since the area or volume of the object enclosure 2 at the center of that enclosure is free of visual obstructions, two different and distinct ones of the chamber parts 26 are observable at the same time, those chamber parts being located on diametrically opposite sides of the enclosure 4. The transparent material, the faceted construction of the parts 10 and 11 and the dual object presentation enables an observer to see a kaleidoscope image heretofore not possible with kaleidoscope construction of the prior art.

Numerous variations, within the scope of the appended claims, will occur to those skilled in the art in light of the foregoing description and accompanying drawings. Thus, the shape of enclosure 4 and body member 2 may be varied. Likewise, the mounting means 3 may be adapted to conform to any variety of shapes employed for either or both the member 2 and the enclosure 4. The number of chamber parts 26 may be changed or the design of the wall sections 25 or wall 23 may be varied. While a transparent material for enclosure 4 is preferred, other embodiments may utilize translucent or opaleseque materials, for example. The design of the reflector 7 may be altered. The particular design shown in the drawing Figures is an equilateral triangle in cross section. This cross sectional shape is commonly used in kaleidoscope design. I have found, however, that image enhancement can be obtained through the utilization of a reflector in a cross sectional shape of an isosceles triangle. In this latter case, the sides 71 and 72 are made substantially longer than the side 70, for example, to obtain the image variation. With this construction, two angles of the triangle are maintained at less than sixty degrees. Consequently, two sides of the reflector 7, in cross section, are elongated while the third side is shortened. The central volume or area of the object enclosure 4 need only be free of visual obstructions along the line of sight of an observer. Various elements of the kaleidoscope described herein as distinct components may be constructed integrally with one another. These variations are merely illustrative.

Having thus described the invention, what is claimed and desired to be secured by Letters Patent is:

1. In a kaleidoscope having a body member, said body member having an opening through it, the improvement which comprises a transparent object enclosure adapted to provide a first and second image as viewed through said opening, and means for mounting said object enclosure to said body member so that said enclosure is rotatable in both a first plane and a second plane with respect to said body member, said enclosure having a material thickness, said material thickness having first and second surfaces, one of said surfaces having a plurality of facets formed thereon.

2. The improvement of claim 1 wherein said object enclosure is spherical.

3. The improvement of claim 2 where the inboard facing surface of said material thickness forming said sphere is faceted.

4. The improvement of claim 2 wherein said sphere defines a chamber, said chamber being divided into a plurality of presized chamber parts along the perimeter thereof.

5. The improvement of claim 4 wherein said mounting means comprises an inner support ring mounted to said body member, rotating means mounted to said inner support ring and rotatable with respect thereto, said rotating means including a pair of opposed arms, said object enclosure being rotatably mounted to said support means along said arms.

6. The improvement of claim 5 further including a three-sided mirror positioned in said body member and arranged therein so as to restrict line of sight through said body member along said mirror.

7. The improvement of claim 6 wherein said rotating means has an array of openings formed in it.

8. A kaleidoscope, comprising:
a body member having a longitudinal axis and a length along said axis, a first end and a second end, said first end including a wall closing said first end, said wall having a view opening in it;
an axially disposed sight opening in said body member aligned with said view opening in said wall;
reflective means disposed about the inside of said sight opening adapted to provide an illusionary and real composite image at said view opening;
a transparent enclosure for holding a plurality of image forming objects, at least one surface thereof having a plurality of facets formed thereon; and
means for mounting said object enclosure on said body member so that said enclosure is independently rotatable in body a first plane and a second plane with respect to said body member.

9. The kaleidoscope of claim 8 wherein said object enclosure is a spherical shape, said spherical shape defining a chamber, said chamber being divided into a plurality of presized chamber parts along the perimeter thereof, at least two of said chamber parts on diametrically opposite sides of said spherical shape being presented to an observer simultaneously.

10. The kaleidoscope of claim 9 wherein said mounting means comprises an inner support ring mounted to said body member, rotating means mounted to said support ring and rotatable with respect thereto, said rotating means including a pair of opposed arms, said object enclosure being rotatably mounted to said support means along said arms.

11. The kaleidoscope of claim 10 further including a three-sided mirror positioned in said body member and arranged therein so as to restrict the line of sight through said body member along said mirror.

12. The kaleidoscope of claim 11 wherein said rotating means has an array of openings formed in it.

13. The kaleidoscope of claim 12 in which said object enclosure is of spherical shape and it comprises first and second generally symmetrical parts, said parts being joined to one another to form said spherical shape.

14. The kaleidoscope of claim 13 wherein said facet plurality extend circumferentially about said object enclosure.

* * * * *

UNITED STATES PATENT AND TRADEMARK OFFICE
CERTIFICATE OF CORRECTION

PATENT NO. : 4,205,893

DATED : June 3, 1980

INVENTOR(S) : Beverly W. Taylor

It is certified that error appears in the above—identified patent and that said Letters Patent are hereby corrected as shown below:

Column 6, line 16, "body" should be "both"

Signed and Sealed this

Twenty-fourth Day of February 1981

[SEAL]

Attest:

RENE D. TEGTMEYER

Attesting Officer     Acting Commissioner of Patents and Trademarks